(12) United States Patent
Hebert et al.

(10) Patent No.: US 10,628,608 B2
(45) Date of Patent: Apr. 21, 2020

(54) ANONYMIZATION TECHNIQUES TO PROTECT DATA

(71) Applicant: SAP SE, Walldorf (DE)

(72) Inventors: Cedric Hebert, Mougins (FR); Daniel Bernau, Karlsruhe (DE); Amine Lahouel, Mougins (FR)

(73) Assignee: SAP SE, Walldorf (DE)

(*) Notice: Subject to any disclaimer, the term of this patent is extended or adjusted under 35 U.S.C. 154(b) by 196 days.

(21) Appl. No.: 15/633,830

(22) Filed: Jun. 27, 2017

(65) Prior Publication Data
US 2018/0004978 A1    Jan. 4, 2018

Related U.S. Application Data

(60) Provisional application No. 62/356,292, filed on Jun. 29, 2016.

(51) Int. Cl.
*G06F 21/62*    (2013.01)
*G06F 16/2457*    (2019.01)

(52) U.S. Cl.
CPC ...... *G06F 21/6254* (2013.01); *G06F 16/2457* (2019.01)

(58) Field of Classification Search
None
See application file for complete search history.

(56) References Cited

U.S. PATENT DOCUMENTS

2015/0007249 A1*  1/2015  Bezzi .................. G06F 21/6254
                                                                      726/1

OTHER PUBLICATIONS

"An entropy based method for measuring anonymity", Security and Privacy in Communications Networks and the Workshops, 2007. SecureComm 2007. Third International Conference on, Nice, France, 2007, pp. 28-32 (Year: 2007).*

* cited by examiner

*Primary Examiner* — Joseph P Hirl
*Assistant Examiner* — Hassan Saadoun
(74) *Attorney, Agent, or Firm* — Buckley, Maschoff & Talwalkar LLC

(57) ABSTRACT

A set of data is received for a data analysis. The set of data includes personal identifiable information. The set of data is anonymized to protect the privacy information. Risk rates and utility rates are determined for a number of combinations of anonymization techniques defined correspondingly for data fields from the set of data. A risk rate is related to a privacy protection failure when defining first anonymized data through applying a combination of anonymization techniques for the data fields. A utility rate is related to accuracy of the data analysis when applied over the anonymized data. Based on evaluation of the risk rates and the utility rates, one or more anonymization techniques from the number of anonymization techniques are determined. The set of data is anonymized according to a determined anonymization techniques and/or a combination thereof.

16 Claims, 8 Drawing Sheets

US 10,628,608 B2

ANONYMIZATION TECHNIQUES TO PROTECT DATA

RELATED APPLICATIONS

The present patent application claims the priority benefit of the filing date of U.S. Provisional Application No. 62/356, 292, filed 29 Jun. 2016, titled "ANONYMIZATION TECHNIQUES TO PROTECT DATA", the content of which is incorporated herein by reference in its entirety.

FIELD

The field generally relates to database systems, data processing and data anonymization.

BACKGROUND

Companies have a duty to ensure the security of their systems. At the same time, companies have to respect the data protection rules and regulations, and privacy of personal data. For example, companies may store and manipulate private personal data for different business purposes. As a direct consequence of the security requirements, companies are more and more investing in Security Information Event Management (SIEM) systems. Data collected by companies usually includes sensitive or personal identifiable information. SIEM systems face data protection challenges. Data anonymization (also known as de-identification) may be used with respect to protecting private data. The process of data anonymization includes removing or altering data in an effort to make it impossible to determine the privacy information included in the data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
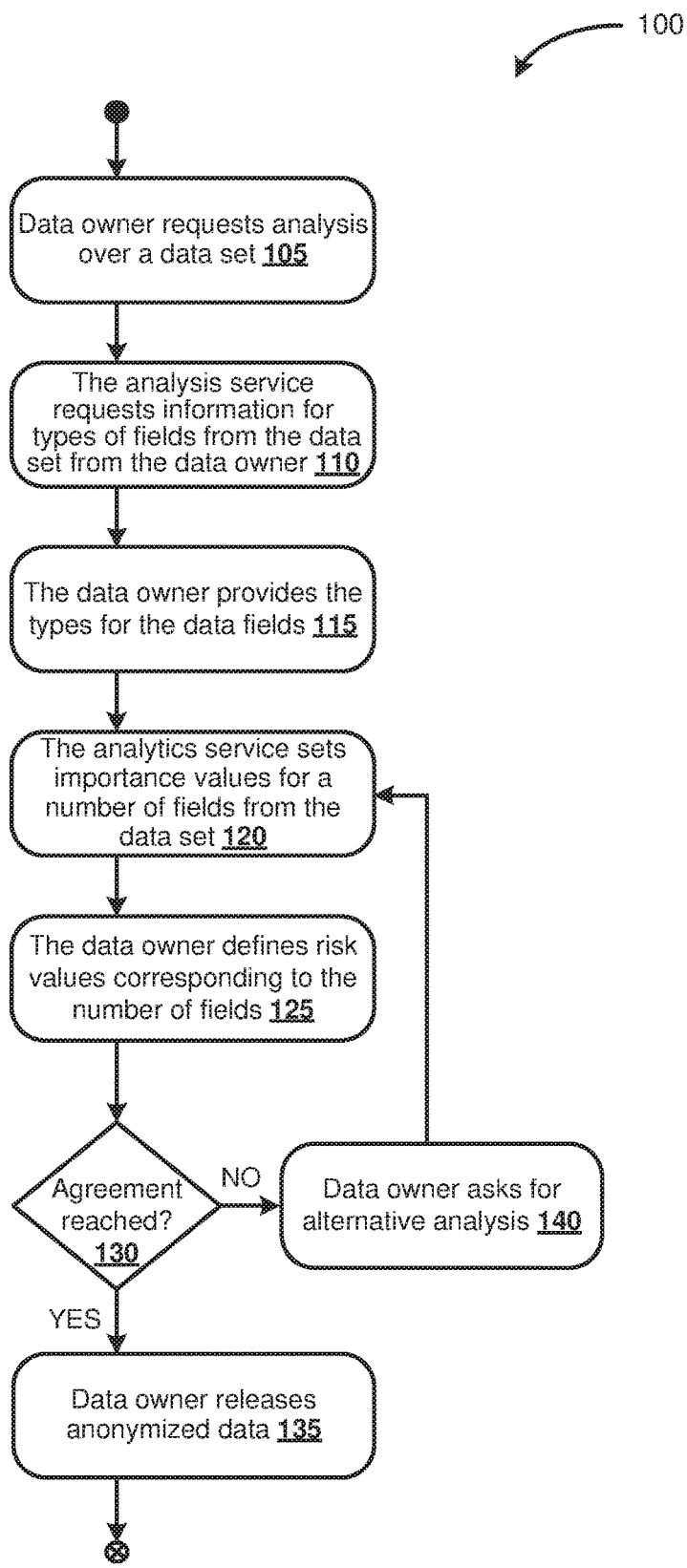
FIG. 1 is a flow diagram illustrating a process for protecting data against re-identification, according to one embodiment.

Embodiments of techniques for protecting data are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

General data protection regulation defines requirement over data in order to be used for analysis for different purposes. Accurate data analysis requires accurate data. Therefore, data protection imposes a challenge for data analysis, where data protection is to be applied. Anonymizing data by generalization or randomization is directly affecting the utility of anonymized data for data analytics processes. Data analysis techniques may be based on different mathematical and statistical means, e.g. covariance, distance measures, topology. Data analysis techniques may be affected very heterogeneously by data anonymization.

Anonymization of data may be performed to generate anonymized data as close as possible to the data from the original data source. The anonymization of data is performed to prevent re-identification of the data and to conflict with data privacy regulations. In such manner, the risk of disclosing private data identity is reduced, as well as the utility of such data in data analysis is meaningfully preserved. Data analysts and data owners may symmetrically control the trade-off between the precision of data analysis versus the risk of some re-identification. In a traditional opt-in/opt-out model in data protection, the data owner may either fully agree or disagree to be involved in data analysis. However, a data owner may be associated with a model, where he/she can offer data in a chosen quality (i.e. driven by the level of anonymization) for data analytics to a data analyst.

A two-step approach may be suggested to separate data. First, the data owner may specifying a data protection goal helping to understand which data has to be protected against re-identification. Some data elements may be with a higher level of importance for data protection, and others may be less important. Based on such considerations, a risk level may be associated with data elements, such as data fields from a data set. Second, the data is anonymized according to an acceptable standard and only then it will be sent to the analysis platform. Therefore, the anonymization of the data may be performed at the data source, versus anonymization at the data storage endpoint.

FIG. 1 is a flow diagram illustrating process 100 for protecting data against re-identification, according to one embodiment. When a data owner requires an analysis to be performed on a data set, a software platform providing analytics services may be requested to prepare an analysis. The data set for analysis may comprise data, which should be anonymized. Therefore, a preparation process for the data to become anonymized and ready for analysis is performed. Details associated with the data set, which is to be analyzed, may be requests in order to design and perform a feasible analysis. However, the data used for the analysis may be required to be anonymized, before a substantial analysis is performed. At 105, a data owner requests analysis over a data set. At 110, the types of the data from the data set may be requested from the data owner. At 115, the data owner provides the data types for the data fields. At 120, an analytics service providing the analysis may set importance values. The importance values may be determined to provide information about which fields of the data set are the most important ones for ensuring a good result precision for the analysis and which ones are less important. At 125, the data owner defines risk values associated with the data and the requested analysis. The risk values are defined based on the provided importance values for the fields from the requested data set. The data owner may compute a utility score, which is a precision level of the analysis, and a risk score. The risk score for a set of data entities within the data set may correspond to the probability that the data entities may be matched back with a person. The risk score is important for cases, where data anonymity should be protected to obey to data protection law. Diverse anonymization scenarios may be simulated over the data. The impact of utility of the data and the risk of non-anonymizing may be computed. Therefore, a proper consensus between the utility and risk may be determined. At 130, it is determined whether an agreement for the defined risk value is reached. If the determined risk is acceptable, then at 135, the data owner may anonymize the data according to a combination of anonymization techniques defined based on the importance values for the fields and the data set.

If such a consensus cannot be reached, at 140, the data owner may request that the data is analyzed through another analysis approach (i.e. different algorithms), which will suggest a better balance to leverage the utility factor and risk factor. For example, the accuracy of the data analysis may be too low for an acceptable level of the risk factor, or the risk rate may be too high for the required accuracy of the data analysis. If no alternative exists, this means that the analysis service cannot be applied under the given privacy constraints requiring data anonymization. In this case, the privacy constraints would have to be redefined based on a renegotiation between the affected parties. However, if a balance between the risk factor and the utility factor is being reached, the data owner will then have the possibility to apply the chosen parameters to the data set defined for analysis. The data set will then be sent to an analysis-as-a-service platform after having been anonymized according to the defined parameters.

Figure 2:
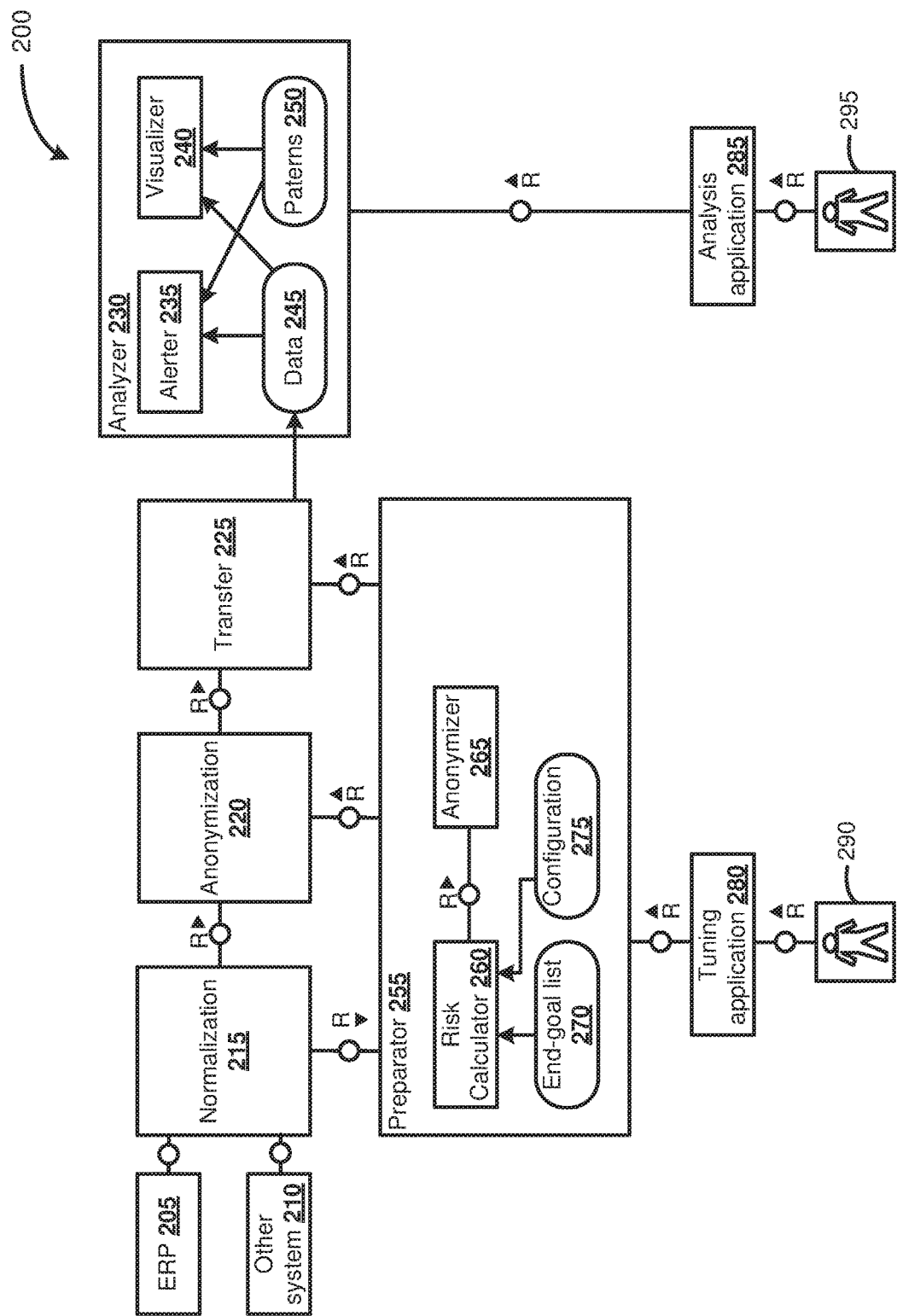
FIG. 2 is a block diagram illustrating an exemplary system for protecting data through anonymization techniques, according to one embodiment.

FIG. 2 is a block diagram illustrating an exemplary system 200 for protecting data through anonymization techniques, according to one embodiment. Software systems may include data, which is at risk for hacking attempts. For example, such systems are the Enterprise Resource Planning (ERP) 205 system, or Other System 210 (e.g. Customer Relationships Management system). Such systems are protected against unauthorized access. For example, attempts for accessing protected data stored within the ERP 205 and/or Other system 210 may be tracked into platform generating log data. Other types of system-generated data, which may be analyzed to detect threats may also be utilized for threat detection. The log data is extracted (via push or pull mechanism, depending on the capabilities of the protected system) and normalized through a Normalization 215 filter. Normalization is performed before a first analysis of the different elements of the data comprised in a log.

After log data is normalized by the Normalization 215 filter, the log data, or a subset of the data, are made available to a Preparator 255 component. The Preparator 255 component determines and applies an anonymization strategy according to data semantics. Data semantics are determined for the analyzed data, as the available data anonymization techniques highly depend on whether data is categorical or numerical. The Preparator 255 component will then provide the data to the Anonymization 220 filter. The data owner may interact to the Preparator 255 component through a front-end (e.g. a web application). For example, data owner 290 may interact with the preparatory 255 component through a Tuning application 280. Through a front-end application, such as the Tuning application 280, a data analytics goal may be configured. The data analytics goal may be configured from a customized End-goal list 270. The End-goal list 270 may be an analytics goals list. The End-goal list 270 may be defined by a data analyst and inputted to the Preparatory 255 component. The End-goal list 270 may define what the data, as received from the normalization 215 filter, will be used for.

In data protection, there is a differentiation between absolute and relative anonymization. If the anonymization is performed by an analysis service based on input from a data analyst, the analysis service may provide customizing functionality to configure absolute or relative anonymization per data analytics process by specifying a data analytics goal. The data analytics goal determines priorities on the anonymization techniques and set a baseline risk level. For example, a target goal may be to monitor evidence about data theft, through analyzing log data. In such a case, it may be important to have a way to re-identify a data owner once enough evidence has been gathered. Thus, information about the users associated with parts of the log data, may be kept in a reversible format. But if the goal is to monitor the spreading of a virus, knowledge about who infected the first computer might be of little value. If such a goal is defined, then it may be possible to remove data about end users entirely. In such manner, the risk of re-identification is decreased. The same argument would hold for the case of a denial of service attack detection.

Based on the chosen analytics goal, the anonymization process may be tuned according to a set of choices, which could be listed in the form of a questionnaire or of a priority list defined in the configuration data storage. Configuration details for the anonymization process may be stored at Configuration 275 component. The defined Configuration 275 may be used to compute an overall risk of non-anonymizing protected data. The defined Configuration 275 may also be used to determine a potential loss in analysis accuracy, as anonymization of data may reflect on proper execution of a data analysis and accurate results generation. The Risk calculator 260 may compute a risk rate associated with the analyzed data, based on the defined goal from the End-goal list 270 and the Configuration 275. The Risk calculator 260 provides the data to the Anonymizer 265, the determined risk rate and utility rate for the selected anonymization method over the normalized data.

Once the determining risk rate and utility rate are acceptable, the data owner completes the process, at which point the Anonymization 220 component will process the incoming data according to the specified rules and forward received log data from the Normalization 215 component to the Transfer 225 module.

The Transfer 225 module is in charge of sending the anonymized data to an external database, which may be part of another hardware or virtual machine. The Transfer module 225 provides the anonymized data to an Analyzer 230 to perform an analyzes over the data. The Analyzer 230 stores the anonymized data as Data 245. The Analyzer 230 can be implemented as a SIEM system, such as SAP Enterprise Threat Detection. The Analyzer 230 may process the data 245 and react to it based on possible alert patterns, such as Patterns 250 and visualization algorithms. The Analyzer 230 is coupled to an Analysis application 285, which is provided for interaction with a user 295. The user 295 may be a data analyst, who performs analysis over received data from a system, such as the ERP 205 system to determine possible security incidents. The Analyzer 230 includes an Alerter 235 module to determine alerts based on existing Patterns 250 in the Data 245. The Visualizer 240 may generate visualization of data results for performed analyzes based on the Data 245, and the Patterns 250.

Risk Computing and Accuracy Computing

Anonymization of data is used to preserve privacy of data before applying a data analysis. Randomization and generalization of data provide different guarantees for accuracy of the results of the data analysis compared to the results, which may be achieved with the data before randomization and generalization. An approach for unification of different privacy guarantees is defined. The approach is illustrated with three examples from the threat detection domain.

In one embodiment, an approach for anonymization of data may be performed by the anonymization 220 components from FIG. 2. The anonymization process may include defining a customizing framework, consisting of 4 tables for quantification of privacy preservation in data analysis processes. A data set may be requested for a data analysis, where the data set includes privacy data. Therefore, an anonymization may be performed over the data before the data analysis. The anonymization may include a preparation of the data to determine an approach for anonymization, which satisfies predefined conditions. An identification strength may be set for a number of attributes of a data tuple from the data set, which tuple is involved in a data analysis query. The identification strength for a field may define how easy it is to identify the privacy identity of data comprising privacy protected information. For example, a field comprising data about a person's name, or personal identification number may have a high identification strength.

In one embodiment, data owners may be associated with data, which is to be anonymized, for example for analysis purposes. The data owner may trigger a determination and/or selection of an appropriate privacy level based on assumed sensitivity (i.e., confidentiality) of the data to be anonymized. Therefore, weights for attributes of the data may be defined. An attribute weight may define how much the attribute is semantically considered as an identifier for the individual row in the database where the data is stored. Table 1 presents an example of how weight values may be defined in relation to defined strength of attributes as identifiers.

TABLE 1

| Identifier weight definition | |
| --- | --- |
| Identifier | Weight |
| Strong | 3 |
| Medium | 2 |
| Low | 1 |
| Non-identifier | 0 |

Based on defined weight values, an aggregated total weight for a database comprising the data to be anonymized may be computed, where the data has n attributes. The computation of the aggregated total weight may be according to the below formula:

$$\text{total weight} = \frac{\sum_{i=1}^{n} \text{weight}(\text{attribute}_i)}{n}$$

In some embodiments, a privacy importance in relation to the identification strength may be set for a number of attributes of data from the data set. The data may be stored in form of data tuples involved in a data analysis query. The privacy importance may define how important is for a field to be included in a data analysis to determine useful results. These two criteria—privacy importance and identification strength, may represent a base for quantification of a set of anonymization processes, based on different approaches for anonymization.

For example, Table 2 is an exemplary representation of a table definition for a table from a customizing framework for quantifying usefulness of parts of the data for re-identification of personal identifiable information, for example, re-identification of a data owner. The 'Field' column depicts an attribute of a data tuple. The 'Identifier' column states a configurable value for an attribute. For example, a high value is determined when the field is very useful for identifying the personal identifiable information of a data tuple corresponding to a log entry. In another example, a low value is determined when the field may be used as a secondary evidence when it comes to identification of a personal identifiable information. The "Importance" column states the expected impact of an attribute for the data analytics process, e.g. correlation, clustering, regression. Anonymization of fields marked as "Very important" may have a greater impact on utility of such data tuple, than the anonymization of fields marked as "Important", "Medium importance", or "Not Important". Anonymization of fields marked with a "Strong" identifier, may have a greater impact on re-identification (or non-re-identification), than anonymization of fields marked as "Medium" or "Low". There may be connections between fields, which may assist in identifying personal information. For example, a combination of a first name and a last name can be as a strong identifier, such as an email address. Therefore, a risk level associated with a given anonymization technique may depend on the anonymization of the first name field and the last name field, but also on the combination of both fields.

TABLE 2

| Field | Identifier | Importance |
|---|---|---|
| {tuple attribute} | {Strong, Medium, Low, Non-identifier} | {Very Important, Important, Medium importance, not important} |

The criteria for an identifier strength and importance may be linked to numerical weights, where a high weight results in a high impact. Table 3 and Table 4 represent an exemplary weight scale for the identifier strength and the importance.

TABLE 3

| Identifier | Weight |
|---|---|
| {Strong, Medium, Low} | {0, . . . , 10} |

TABLE 4

| Importance | Weight |
|---|---|
| {Important, Important, Medium importance, not important} | {0, . . . , 10} |

The different techniques for anonymization are quantified by the privacy guarantees. Different anonymization techniques may be selected based on determining a table comprising a set of data. A column from the table may correspond to an attribute of a data tuple, where the table includes a set of tuples. A column may be kept as-is, randomized, or deleted entirely. Operations can also be executed on the table level, including different anonymization techniques, such as k-anonymity, l-diversity and t-closeness. Such anonymization techniques aim at making sure that one row is looking similar to at least a number of other rows, for example k–1 rows for the k-anonymity. The anonymization may be performed through different means including column binning (e.g. partial removal of data).

Differential privacy is an anonymization technique for numerical attributes, which has a relative anonymization guarantee on the similarity of a randomized distribution compared to the original data set.

For example, the risk rates may be determine according to formula (1):

Risk rate=SUM(weight(identifier)*technique(factor score))/SUM(weight (identifier))    (1)

In one embodiment, the risk rate may be computed as a formula based on identifiers, corresponding weights, anonymization technique and its factor score.

A threshold for the risk factor may be deduced based on a total weight value computed based on weights of identifiers of data from a data set, to be anonymized. Total weight computed may be a rounded number to an upper integer to allow for faster data evaluation. In one embodiment, based on the computed total weights, minimal privacy parameters for differential privacy (i.e., ε) and k-anonymity (i.e., k) may be determined. A higher total weight may indicate that the data to be published as anonymized receives a stronger privacy level, and thus a stricter minimal threshold on the privacy parameter. Table 5 represents an exemplary definition of minimal privacy parameters for differential privacy and k-anonymity according to the determined total weight. The value of k is derived from the value for epsilon (ε), so that k-anonymity and ε-Differential privacy algorithms (i.e., SmallDB algorithm) yield the same risk rate.

TABLE 5

Privacy parameters in functions of total weight

| Total Weight | ε-Differential privacy | k-anonymity |
|---|---|---|
| 3 | 0.1 | K: H(k) == H(diff_privacy(0.1)) |
| 2 | 1 | K: H(k) == H(diff_privacy(1)) |
| 1 | 3 | K: H(k) == H(diff_privacy(3)) |
| 0 | 10 | K: H(k) == H(diff_privacy(10)) |

In Table 5, the risk rate is denoted by the function H(k) for computing the risk rate. In one embodiment, the risk rate may be based on Shannon Entropy measure. From an information theory perspective, Shannon Entropy gives an insight about the average quantity of information given by a probability distribution P. Shannon Entropy measure value may be an indicator about how much information is leaked by using a certain anonymization technique.

A probability distribution function P(r|s) may be defined for computing conditional probability of knowing the correct answer "r" to a query "q" on the original dataset (including data to be anonymized) while knowing "s", where "s" is the anonymized answer to "q".

The anonymization might be performed in form of a non-interactive (offline) or an interactive (online) approach. Non-interactive anonymization techniques take a dataset as input and output an anonymized dataset. The anonymized data set may be given to a data analyst for analysis purposes, for example for querying and evaluation. In contrast, interactive anonymization techniques require access to the original dataset and the query to produce an anonymized result that may be handed to the data analyst. In both cases, the definition of probability P(r|s) to provide different probability values P, differing with the anonymization technique used, is valid. Each technique may be associated with a different probability distribution to work with.

After defining the probability P, the risk rate H, may be interpreted as a function of the determined probability P. Therefore, the risk rate H(P) may be an application of Shannon Entropy on the probability function P. In one embodiment, the risk rate H(P) may be computed based on a formula such as the below formula (2):

$$H(P) = -\Sigma_r P(r|s) \log_2 P(r|s) \quad (2)$$

The interpretation of the formula for the risk rate H(P) may be interpreted in different ways depending on the anonymization technique used. For example, a case of k-anonymity and Differential Privacy interpretation of the equation may be defined.

In k-anonymity technique, a dataset may be generalized into clusters of at least k indistinguishable records with respect to their quasi-identifiers. A data analyst may formulate a query (denoted by "q") in relation to a request to determine whether a person (denoted by "p") has a property (denoted by "a"). The query may be defined as q(p=a). The system will yield the anonymized answer "s" to q(p=a). In such an example, the risk rate H that is computed may be associated with determining how much information "s" is leaking about the original record "r" tied to "p" (where "r" and "p" and "s" are parameters from the formula for computation of the risk rate H). The computed risk rate value may also be associated defining the amount of information associated with a right answer when evaluating q on the original dataset.

In one embodiment, when a non-interactive differential privacy algorithm is selected, and a dataset "r" is taken as input, the algorithm may produce a synthetic dataset "s" that may be utilized by a data analyst to run queries and perform analyzes. In this case, risk rate value is associated with determining how much information the data analyst will know about "r" given "s".

In one example, the risk rate value of H may be equal to 0, which may express that there is no information to gain, due to the absence of uncertainty and "r" is implicitly known through "s" (P(r|s)=1). The risk rate value may be maximized when all the probabilities for the different "r", while knowing "s", represent a uniform distribution, which may be interpreted as a high uncertainty about "r".

In one embodiment, an anonymization technique may reduce the data utility. Utility is a relative measure tightly related to a type of data analysis and relatedly run queries over data. A type of data analysis may be associated with a set "Q" of defined queries to be run on a certain dataset. The set "Q" may be assumed to be known and provided by a data analyst.

In one embodiment, when an analysis over the anonymized data is performed, a defined analysis goal might not be feasible as anonymization might have affected the utility of the data for the defined analysis goal. Therefore, a metric to measure how much of the original data is affected may be defined. Such a utility metric may be computed and provided through a system providing implemented functionality related to anonymization techniques to be applied over provided data. Such a system may be as system 200 and the provided Preparator 255 module. Through the system, a user might receive insight on the effect of applying different combination of anonymization techniques. In such manner, informed decisions about which anonymization technique to use and how much disclosure risk is about to be accepted might be taken.

Table 6 includes a set of techniques that may be applied for anonymization of data. The techniques include a no-anonymization technique, a differential privacy technique, a binning technique, and a deletion technique. For example, the differential privacy technique may be limited to an epsilon guarantee within the range of 0.01 to 10. The normalization of the data may be performed by multiplication of a constant defined factor. The techniques are associated with a factor score, which may be a percentage value. Based on the factor score, consistency of the diverse techniques for anonymization over data from the data set may be achieved and blending of the techniques may be performed. The definition of a factor rate eases the inherent issue of different scales between k-anonymity (absolute guarantee) and differential privacy (relative guarantee). These techniques may decrease the risk of re-identification, but also decrease the data utility for performing a data analysis over the anonymized data.

TABLE 6

| Technique | Factor score |
| --- | --- |
| None | 100% |
| Differential Privacy (epsilon guarantee; limited in range [0.01, 10]) | Epsilon * constant |
| Binning (%) | X % (depends on amount) |
| Deletion | 0% |

The anonymization technique employed will also influence the percentage factors. A deletion technique includes data removal and may have a stronger impact on risk rates and utility rates. A partial removal of data, such as the removal of data in the binning technique, may have a less stronger impact on risk rates and utility rates. Further, differential privacy may have a low impact on risk rates and utility rates, and no anonymization may have a null impact of both risk and utility rates. The exact formulas to assign fields from the data to a technique from the list in Table 6, may be implemented as a configuration table or by an implemented algorithm in an anonymization module, such as Anonymization 220 component in FIG. 2. The factor scores defined for the techniques may be adapted and changed based on reevaluation of the techniques, or inclusion of other techniques in Table 6, or other considerations associated with labeling of fields, or structuring the data that is being anonymized. Such considerations may have an impact on computed gain or loss as defined by the risk rate when using anonymization techniques.

Risk rates and utility rates may be determined through formulas, which formulas may be implemented in the suggested customizing framework. The risk rates may be associated with a risk factor for no-anonymization of data after applying a given anonymization technique. The utility rates may be associated with a given anonymization technique for a data set, which if applied may diminish the utility of the data set for performing an analysis. For example, the analysis may be to determine security threats in log files, as suggested in relation to FIG. 2.

In one embodiment, a formula for computation of a risk rate may be based on determined identifiers from attributes at a data set to be anonymized, weights defined for the identifiers, techniques applied. Further the formula for the risk rate may be associated with defined queries for analyzing the data after applying the anonymization based on different techniques selected. A formula for a utility rate may be based on a defined anonymization technique. The utility rate measurement may be also related to the queries that are to be applied over the data, which is also relevant for the computation of the risk rate.

In one embodiment, the utility rates may be determined according to formula (3) or formula (4):

$$\text{Utility rate} = SUM(\text{weight(importance)} * \text{technique(factor score)}) / SUM(\text{weight(importance)}) \quad (3)$$

$$u(Q, A) = \max_{q \in Q} |d(a_r, a_s)| \quad (4)$$

The utility rate formula at formula (3) is associated with a maximum distance "d" between the queries answers "$a_r$" on the original data set and the answers "$a_s$" on the anonymized data set using the anonymization technique denoted by "A".

The distance function "d", defined for formula (3) above may differ depending on the output of the query. In one embodiment, the distance "d" may be interpreted as a Hamming distance when the outputs of the queries are textual, and Euclidean distance when they are numeric. Different interpretations of the distance measure may be used for complex output determines based on the query function q.

The utility rate may indicate regarding loss of utility due to the anonymization technique "A" for a given query. It may not be an indicator for loss of utility for analysis goals in general. If a data set is not useful for an analysis goal defined for a type of data analysis, the utility rate will just tell how much it will be worse when the anonymization technique "A" is applied, and will not tell whether the anonymized data set is not useful for the type of data analysis.

When utility rate "U" is computed based on formula (3), and it is determined that u(Q, A)=0, that result for the utility rate may be interpreted to indicate that no loss of utility for the data set will take place. When u(Q, A)=0, then the data is not anonymized. The higher the determined value for the utility rate, the higher the utility loss for the data, so the data analyst should anticipate worse analytical results.

The data owner may aim at protecting the privacy of the data. The risk rate may be interpreted as a factor for re-identification of privacy protected information in the data, which is anonymized, from the point of a data owner. The data owner may also aim at including such anonymized data in a data analysis to support a data analytics goal. Utility rate is defined from the perspective of the utility of the data for the data analysis to achieve the data analytics goal. For example, from utility perspective, non-anonymized data may have a higher utility during a data analysis to achieve a data analytics goal, as the non-anonymized data comprises the characteristics of the data set. Whereas, anonymized data is modified data and therefore, such modification may affect the utility of the data for purposes of the data analysis. Therefore, a consensus or balance between these two rates— the risk rate and the utility rate, is to be determined when comparing such rates for different anonymization techniques or combinations of anonymization techniques.

The described processes and systems herein are associated with facilitation of a data owner to control the risk to be taken and to allow for definition of anonymization algorithms on data based on computed utility and risk rate and not blindly. In such manner, combinations of different anonymization techniques for reaching consensus may be determined. It is appreciated that tuning of the formulas and factors may be considered upon implementation of embodiments of the invention and a series of iterations to determine an optimal combination of techniques may be performed before reaching optimal (e.g. maximum) efficiency.

A certain risk rate threshold value may be defined to control and limit the risk rate, while determining an anonymization technique to be applied. A utility rate threshold value may also be defined to allow for determining a data analysis, which when performed over the anonymized data, may achieve a higher utility of the data. With the definition of threshold values for the risk rate and the utility rate, an anonymization technique may be determined that may be defined according to the privacy restrictions on the data and according to analytics goals for the data. Different anonymization techniques may be combined to determine a pair of a risk rate and a utility rate that comply with the defined threshold values.

EXAMPLES

An anonymization process is described below with three examples for determining anonymization techniques to be applied over data. The data is defined to be analyzed according to a data analytics goal. For each example, the baseline risk rate of re-identification is 100%, while providing a baseline utility rate of 100%. The data analytics goal defined for the exemplary cases comes with a specific 'Importance' list. The 'Identifier' list is the same for the goals defined in the examples. The 'Importance' list and the 'Identifier' list are such as the defined identifier and importance in Table 1 above.

Example 1: Analysis of Possible Data Theft

Example 1 is associated with analyzing data to determine a possible data theft. The data analytics goal for is to identify a source of a detected leak through analyzing sensitive data, which is extracted from a company network. From an analytic point of view, Table 7 describes a set of fields, comprising data, which is defined for an analysis for detection of a data theft via a data correlation analysis technique. Table 7 defines 8 fields, such as Host file system access, HTTP traffic, Other network traffic, etc. The fields as defined in Table 7 are mapped to an identifier value and an importance value. The identifier column and importance column correspond to the defined identifier and importance columns in Table 1.

TABLE 7

| Field | Identifier | Importance |
|---|---|---|
| Host file system access | Medium | Important |
| HTTP traffic | Medium | Medium importance |
| Other network traffic | Low | Not important |
| RFC Network traffic | Medium | Very Important |
| Source IP address | Medium | Very Important |
| Timestamp | Low | Important |
| Transaction name | Low | Very Important |
| Username | Strong | Very Important |

For the current example 1, the identifier values correspond to the risk values associated correspondingly with the fields. The importance values correspond to the utility values associated correspondingly with the fields. The identifier values and the importance value are defined according to an identifier scale and an importance scale as presented in Table 1. The identifier values and the importance value are quantified to weight values for the current example as presented in Table 8 and Table 9. Table 10 presents a set of techniques for anonymization of data, which may be applied over the data in the current example 1. The techniques presented in Table 8 include a "none" technique, which defined no anonymization of the data. The techniques further include a "deletion" technique, which defined that an exclusion of a data field from the data is performed to achieve anonymization. The "none" technique have a score of 100, since according to such a technique no data is deleted and all data remains the same—therefore, the risk of re-identification is not reduced. The "deletion" technique have a score of 0, since all of the data is removed, and the remaining risk for re-identification for the anonymized data according to such a technique is equal to 0 from the field's perspective. The techniques also include pseudonymization, and binning. For example, the pseudonymization technique defines a procedure by which the most identifying fields from the data are replaced by one or more artificial identifiers, or "pseudonyms".

TABLE 8

| Identifier | Weight |
|---|---|
| Strong | 6 |
| Medium | 3 |
| Low | 1 |

TABLE 9

| Importance | Weight |
|---|---|
| Very important | 10 |
| Important | 6 |
| Medium importance | 3 |
| Not important | 1 |

TABLE 10

| Technique | Factor score |
|---|---|
| None | 100% |
| Pseudonymization | 50% |
| Binning (%) | X % (depends on amount) |
| Deletion | 0% |

A risk rate threshold value is set to 10% and a utility rate threshold value is set to 50%. The threshold values define upper values for the range defined for the risk rate and the utility rate. A set of combination of the techniques from Table 10 applied over the fields from Table 7 may be defined. For a given combination of the techniques from Table 8 for the fields from Table 7, a given risk rate and a utility rate may be computed based on the formulas (1) and (3) and applying the identifier and importance values as defined in Tables 7, 8 and 9.

Table 11 presents an exemplary combination of techniques for the fields. For example, for field "Host file system access", a technique "deletion" is selected. The field "Host file system access" is defined with an importance value, equal to "Important", which has a weight equal to "6". The technique "Deletion" is defined with a factor score equal to "0".

TABLE 11

| Field | Identifier (weight) | Importance (Weight) | Technique | Factor score |
|---|---|---|---|---|
| Host file system access | 3 | 6 | deletion | 0 |
| HTTP traffic | 3 | 3 | deletion | 0 |
| Other network traffic | 1 | 1 | none | 100 |
| RFC Network traffic | 3 | 10 | none | 100 |
| Source IP address | 3 | 10 | none | 100 |
| Timestamp | 1 | 6 | none | 100 |
| Transaction name | 1 | 10 | none | 100 |
| Username | 6 | 10 | pseudo-nymization | 50 |

TABLE 12

| risk rate = | 57.14285714 | % |
|---|---|---|
| utility rate = | 75 | % |

The risk rate and the utility rate for the defined set of fields, with the defined combination of techniques are computed and presented in Table 12. The computation of the risk rate and the utility rate is based on formulas (1) and (3). The computations are based on the importance's weight and the factor scores of the techniques correspondingly defined for the fields.

The risk rate is still too high above the risk rate threshold value. A redefinition of the combination of the techniques may be applied to reduce the risk rate to 10%. Based on a combination of the anonymization techniques, a k-anonymity with a different value "k" may be defined. The "k-anonymity" value can be computed 'on-the-fly' when playing with different combination of the techniques on the different fields. For example, it may be determined (by a preparator module such as the Preparator 255, FIG. 2) that if you add binnage of the field "RFD Network traffic" at a score equal to 15% (instead of "none" technique), the achieved k-anonymity is with a value equal to 6. The combinations of anonymization techniques may be iterated until the risk rates and utility rates are computed to be with an acceptable value. The idea is then to optimize this value of "K" by playing with the different techniques and percentages until achieving a reasonable value for "K". For example, the risk rate can be reduced to 10% by using the value 6 for computing k-anonymity technique. The k-anonymity technique may be applied over the data, being anonymized, through defining at least 5 more rows than a given row in the data. The k-anonymity technique for anonymization, where k=6 (also known as 6-anonymity), may decrease the risk of non-anonymization to ⅙th of its value. Applying 6-anonymity on the data results in several column binning, with the final result for combination of anonymization techniques defined for the fields as presented in Table 13. The difference in the combination of techniques for the fields is a change in the technique for fields "RFC Network traffic" and "Source IP address"—the technique is changed from "none" to "binning". The factor score for the "binning" technique is defined to 15%, based on the amount of data which was included to achieve 6-anonymity).

K-Anonymity: 6

TABLE 13

| Field | Identifier (weight) | Importance (Weight) | Technique | Factor score |
|---|---|---|---|---|
| Host file system access | 3 | 6 | deletion | 0 |
| HTTP traffic | 3 | 3 | deletion | 0 |
| Other network traffic | 1 | 1 | none | 100 |
| RFC Network traffic | 3 | 10 | binning | 15 |
| Source IP address | 3 | 10 | binning | 15 |
| Timestamp | 1 | 6 | none | 100 |
| Transaction name | 1 | 10 | none | 100 |
| Username | 6 | 10 | pseudo-nymization | 50 |

TABLE 14

| risk rate = | (57%/6) = 9.5% |
|---|---|
| utility rate = | 44.64285714% |

Table 14 includes the computed risk rate and utility rate for the combination of anonymization techniques defined in Table 11. The risk rate and the utility rate are computed for the defined new combination of techniques. The risk rate is below the risk rate threshold value. Therefore, such combination of techniques satisfies the risk conditions that are defined. The utility rate is below the expectation of 50%—it is 44.6%. However, if a k-anonymity with the value 5 is redefined for the fields, there is a possibility that the risk rate may be higher than 10%. Therefore, even though the utility rate is below the utility threshold value, such a balance between these two rates may be an acceptable combination. The computed risk rate and utility rate may be provided for evaluation to determine if they may be accepted. For example, a data analyst or a data scientist may perform the evaluation. In another example, the evaluation may be performed by an evaluation module part of a preparation data module, such as the Preparator 255, FIG. 2. The determined risk rate and utility rate may be confirmed as acceptable, and the defined combination of techniques for anonymization of the data may be applied.

Example 2: Surveillance of Possible Virus Spreading

Example 2 is associated with analyzing data to determine a possible virus spreading. The data analytics goal for is to identify whether machines are infected by software able to replicate to other machines and to execute actions such as copying files, capturing keystrokes and communicating with an external attacker-controlled machine. Table 13 presents a set of fields from the data. Table 15 defined the fields together with an identifier value and an importance value. Table 15 is defined as suggested by Tables 1, 2 and 3.

TABLE 15

| Field | Identifier | Importance |
|---|---|---|
| Host file system access | Medium | Important |
| HTTP traffic | Medium | Very Important |
| Other network traffic | Low | Very important |
| RFC Network traffic | Medium | Medium importance |
| Source IP address | Medium | Important |
| Timestamp | Low | Medium importance |
| Transaction name | Low | Not important |
| Username | Strong | Not important |

The threshold values for the risk rate and the utility rate are determined for the defined data analytics goal. The risk rate threshold value is defined to be below 10%, and the utility rate threshold value is defined to be higher than 75%. After defining a set of combinations of techniques for anonymization (as defined in Table 5), Table 16 is defined. Table 16 includes a mapping between a field, an identifier weight, an importance weight, a technique, and a factor score for the technique. Table 16 describes an exemplary combination of techniques, where the identifier weight and the importance weight are quantified as defined in Table 8 and 9 from Example 1. Table 17 comprises the computed risk rate and utility rate for the combination of anonymization techniques as defined in Table 16, according to weighted value of the identifier values and importance values defined for the fields in Table 15. The computation of the risk rate and the utility rate are performed according to formulas (1) and (3).

TABLE 16

| Field | Importance (Weight) | Identifier (Weight) | Technique | Factor score |
|---|---|---|---|---|
| Host file system access | 6 | 3 | none | 100 |
| HTTP traffic | 10 | 3 | none | 100 |
| Other network traffic | 10 | 1 | none | 100 |
| RFC Network traffic | 3 | 3 | deletion | 0 |
| Source IP address | 6 | 3 | none | 100 |
| Timestamp | 3 | 1 | deletion | 0 |
| Transaction name | 1 | 1 | deletion | 0 |
| Username | 1 | 6 | deletion | 0 |

TABLE 17 risk rate = 47.61904762%
utility rate = 80%

To reduce the risk under 10%, a k-anonymity where k=5 may be defined. The k-anonymity with the value k=5 may be defined through a different combination of anonymization techniques correspondingly defined for the fields. The different combination of anonymization techniques may be iterated on the data for the defined fields. With a k-anonymity with the value 5, five rows in the anonymized data may correspond to one row from the original data. Therefore, the risk rate may be 5 times less. Table 18 presents the combination of anonymization techniques to achieve 5-anonymity.

The factor scores are adjusted for the binning technique to correspond to a k-anonymity technique. Table 19 includes the computed risk rate and utility rate for the defined combination of anonymization techniques defined in Table 16.

TABLE 18

| Field | Importance (Weight) | Identifier (Weight) | Technique | Factor score |
|---|---|---|---|---|
| Host file system access | 6 | 3 | binning | 80 |
| HTTP traffic | 10 | 3 | binning | 80 |
| Other network traffic | 10 | 1 | binning | 80 |
| RFC Network traffic | 3 | 3 | deletion | 0 |
| Source IP address | 6 | 3 | binning | 80 |
| Timestamp | 3 | 1 | deletion | 0 |
| Transaction name | 1 | 1 | deletion | 0 |
| Username | 1 | 6 | deletion | 0 |

TABLE 19

Utility rate = 64%
Risk rate = 48%/5 = 9.5%

The computed risk rate complies with the defined risk rate threshold value, however, the utility rate threshold value is above the computed utility rate of 64%. The computed utility rate and risk rate may be provided for evaluation, for example to a user of a system for anonymization of data, which is implemented to perform the anonymization process as described herein. The computed rates may be provided through a tuning application, such as the Tuning application 280, FIG. 2. The utility rate and the risk rate may be determined as acceptable, and the defined combination of anonymization techniques (as in Table 18) may be confirmed.

Example 3: Microdata Outlier Detection

Example 3 is associated with analyzing data to detect outliers in HTTP traffic (traffic anomaly, for example, bound to a rootkit connecting to a command and control server). For example, a differential privacy technique may be applied over the data for anonymization. Outliers may be detected under added noise if they are representing through significantly higher values in comparison to the normal values (i.e. 90 percentile threshold). By applying the differential privacy technique, the microdata structure can be preserved at quantifiable privacy guarantees.

As differential privacy can be infinitely fine-tuned by the expressed privacy level "Epsilon" in a differential privacy algorithm. In the current example 3, the "Epsilon" value may be configured in the range of 0.1 to 10, where 0.1 corresponds to a high privacy guarantee, and 10 corresponds to small privacy guarantee. A normalization factor may be applied for normalization of the data before applying of the anonymization techniques, where the normalization factor may be set to the defined epsilon values. In such manner, a factor score for the anonymization technique "Differential Privacy" is 50%, which corresponds to the intuition of 50% privacy for the corresponding field. Table 20 presents the defined anonymization techniques, which may be combined while anonymizing fields from the data, which is analyzed to detect outlier in HTTP traffic. Table 21 presents the fields from the data for the data analysis.

TABLE 20

| Technique | Factor score |
|---|---|
| None | 100% |
| Differential Privacy (epsilon guarantee; limited in set {0.01, 1, 10} with According normalization factors {100, 10, 5}) | Epsilon * normalization factor ({0.01 * 100, 1 * 10, 10 * 5}) |
| Pseudonymization | 50% |
| Deletion | 0% |

TABLE 21

| Field | Identifier | Importance |
|---|---|---|
| Host file system access | Medium | Not important |
| HTTP traffic | Medium | Very Important |
| Other network traffic | Low | Not important |
| RFC Network traffic | Medium | Not important |
| Source IP address | Medium | Important |
| Timestamp | Low | Medium importance |
| Target IP address | Low | Important |
| Username | Strong | Very important |

TABLE 22

| Field | Identifier | Weight | Technique | Factor score |
|---|---|---|---|---|
| Host file system access | Medium | 3 | deletion | 0 |
| HTTP traffic | Medium | 3 | differential privacy | 50 |
| Other network traffic | Low | 1 | deletion | 0 |
| RFC Network traffic | Medium | 3 | deletion | 0 |
| Source IP address | Medium | 3 | pseudonymization | 50 |
| Timestamp | Low | 1 | none | 100 |
| Transaction name | Low | 1 | deletion | 0 |
| Target IP address | Low | 1 | none | 100 |
| Username | Strong | 6 | pseudonymization | 50 |

Table 22 includes a combination of anonymization techniques defined correspondingly for the fields from the data. Based on the weight of the identifier values for the fields and the factor score for the anonymization techniques, a risk rate is computed according to formula (1). The risk rate is determined to be equal to 36.363636364%.

TABLE 23

| Field | Importance | Weight | Technique | Factor score |
|---|---|---|---|---|
| Host file system access | Not important | 1 | deletion | 0 |
| HTTP traffic | Very Important | 3 | differential privacy | 50 |
| Other network traffic | Not important | 1 | deletion | 0 |
| RFC Network traffic | Not important | 1 | deletion | 0 |
| Source IP address | Important | 6 | pseudo-nymization | 50 |
| Timestamp | Medium importance | 3 | none | 100 |
| Transaction name | Important | 6 | deletion | 0 |
| Target IP address | Very important | 10 | none | 100 |
| Username | Not important | 1 | pseudo-nymization | 50 |

Table 23 includes the combination of anonymization techniques as presented in Table 20 defined correspondingly for the fields from the data, together with weights for the importance values. Based on the weighs of the importance values for the fields and the factor score for the anonymization techniques, a utility rate is computed according to formula (3). The utility rate is determined to be equal to 56.25%. The determined utility rate and risk rate may be provided for evaluation to determine if the determined combination of anonymization techniques is acceptable. If the rates are not acceptable, then a new combination of anonymization techniques may be determined. If the rates are acceptable, then the combination of anonymization techniques, as defined in Tables 22 and 23, may be utilized to anonymize the data.

In the presented three examples, the anonymization techniques may modify the data to ensure that the risk rate is not higher than 10% to get any row re-identified. The risk rate is associated with re-identification of the personal identifiable information in the data. K-anonymity and differential privacy, as anonymization techniques may be chained, in case that the privacy guarantees for k-anonymity alone are not sufficient and are not acceptable. In such case, a numerical aggregate that was produced via k-anonymity would be further randomized. However, such numerical aggregation may decrease the utility of the anonymized data for a data analysis.

Figure 3:
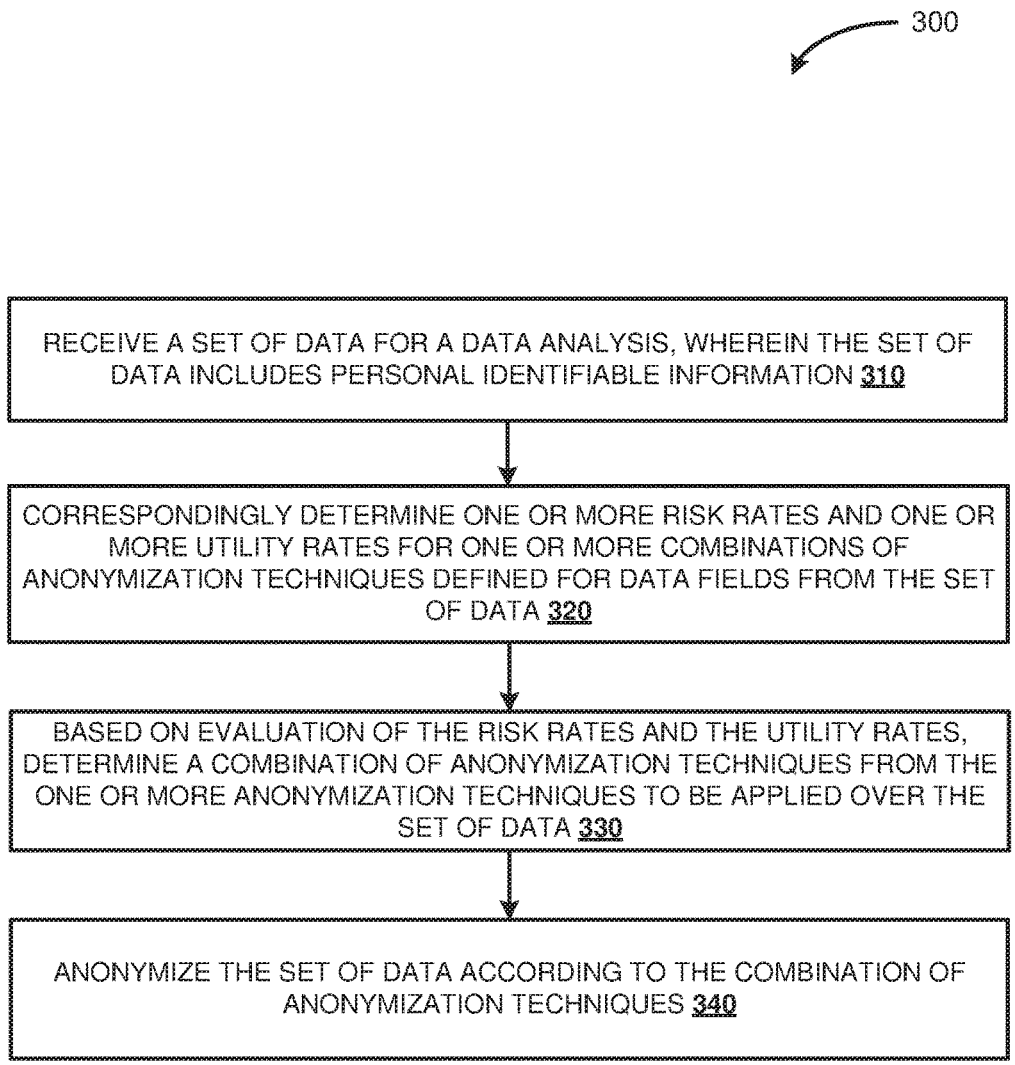
FIG. 3 is a flow diagram illustrating an exemplary process for protecting data including personal identifiable information through determining an anonymizing technique, according to one embodiment.

FIG. 3 is a flow diagram illustrating an exemplary process 300 for protecting data including personal identifiable information through determining an anonymizing technique, according to one embodiment. At 310, a set of data is received for a data analysis. The set of data includes personal identifiable information. At 320, one or more risk rates and one or more utility rates for one or more combinations of anonymization techniques defined for data fields from the set of data are determined. The determining of the combinations of anonymization techniques may be as suggested in the Examples section above. A first risk rate is determined for a first combination of anonymization techniques. The first risk rate is related to a privacy protection failure when defining first anonymized data through applying the first combination of anonymization techniques for the data field. For the first combination of anonymization techniques, a first utility rate is also determined. The first utility rate is related to accuracy of the data analysis when applied over the first anonymized data. The risk rates and the utility rates may be determined through computations according to formulas, such as formula (1) and formula (3) suggested in relation to FIG. 2. At 330, based on evaluation of the risk rates and the utility rates, a combination of anonymization techniques from the one or more anonymization techniques is determined. At 340, the set of data is anonymized according to the determined combination of anonymization techniques.

Example 4: Analytical Analysis

The example below demonstrates how embodiments of the invention disclosed herein may be implemented in practice. A synthetic database composed of a collection of binary attributes is defined to include data comprising personal identifiable information. A row of the rows of the database represents a different person. The database may be denoted as database X and may be such as the exemplary database presented in Table 24. We note the database as X, the rows as x, and the attributes as xi. The example X is as depicted in Table 1.

TABLE 24

| Example database X | | |
|---|---|---|
| Is Male? | Is Married? | Have Children? |
| 0 | 0 | 1 |
| 0 | 1 | 1 |

TABLE 24-continued

Example database X

| Is Male? | Is Married? | Have Children? |
|----------|-------------|----------------|
| 1 | 0 | 0 |
| 1 | 1 | 0 |
| 1 | 1 | 1 |
| 1 | 1 | 1 |

It is defined for the current example, that count queries on the database are about to be evaluated. A set Q of queries is defined to include count queries denoted by q, wherein a query from the queries takes three parameters—i, j, k. The query may be represented as q (i, j, k) and associated with the triplet {i, j, k}. The triplet {i, j, k} represents true combinations of attributes {Is Male, Is Married, Have Children}. Possible combination for the triplet include combinations such as {0,0, 0}, {0,0,1}, {0,1.0}, {0, 1, 1}, {1,0,0}, {1,0,1}, {1, 1, 0}, {1,1,1}. For the data comprised in the database, it may be determined a set of privacy parameters thresholds based on attributes weight. Table 25 presents exemplary weights associated with identifiers and attributes.

TABLE 25

| Attribute | Identifier | Weight |
|-----------|------------|--------|
| Is Male? | Low | 1 |
| Is Married? | Low | 1 |
| Have Children? | Non-identifier | 0 |

The total weight value in computed according to formula (5):

Total weight=1 (rounded up to the nearest integer)  (5)

Therefore, for a data owner it may be determined that risk that is yielded by ε>3 in the case of differential privacy or k-anonymity with k<8 (derived from the equivalent entropy) may not be acceptable. Two anonymization algorithms may be suggested by an anonymization process provided by a customization framework, such as those discussed in relation to FIG. 2. The suggested algorithms may include: k-anonymity and Differential Privacy. These techniques have the following properties: k-anonymity may be used to anonymize the data considering the tuple {Is Male, Is Married} as quasi-identifiers. This may lead to a probability of re-identifying a person in the database equal to: P(r|s)=1/k, which is computed based on formula for probability distribution function P(r|s) above. For example, a differential privacy technique such as a SmallDB algorithm may be applied on the data and produces an anonymized dataset that has the following re-identification probability computed based on formula (6):

$$P(r|s) = \frac{\frac{\exp(\varepsilon u(r, s))}{\sum_{s'} \exp(\varepsilon u(r, s'))}}{\sum_{r'} \frac{\exp(\varepsilon u(r', s))}{\sum_{s'} \exp(\varepsilon u(r', s'))}} \quad (6)$$

where r is the histogram representation of X, r' are all the histograms such that |r'|=|r| and r'≠r, s' are the generated histograms by the SmallDB algorithm to approximate r and that are different from the final output of the algorithm s. The formula (6) is derived from the Exponential Mechanism used in the SmallDB algorithm and Bayes Theorem to find the probability of re-identification of the original database.

Using these probability values, it may be determined how the risk, expressed by Shannon Entropy, evolves in function of the privacy parameters—k and ε. In the current example, practical limit of k is k=6, because there are 6 different persons in the database X. This leads to a practical upper bound on the entropy equal to H(6)=2.59.

In one embodiment, it may be determined how the risk evolves as a function of the privacy parameters. Then, the utility rates may be determined. A distance function may be defined to be used in the utility calculations. The distance function d in this example may be the Mean Square Error (MSE) function observed between the results of the queries on the database X and the anonymized databases X*.

A utility rate function and a risk rate function may be defined and graphically represented on one and the same plot area to give the data analyst and the data owner a global overview of the utility-risk characteristics of both anonymization techniques available one may decide the best combination and selection according to their priorities.

Figure 4:
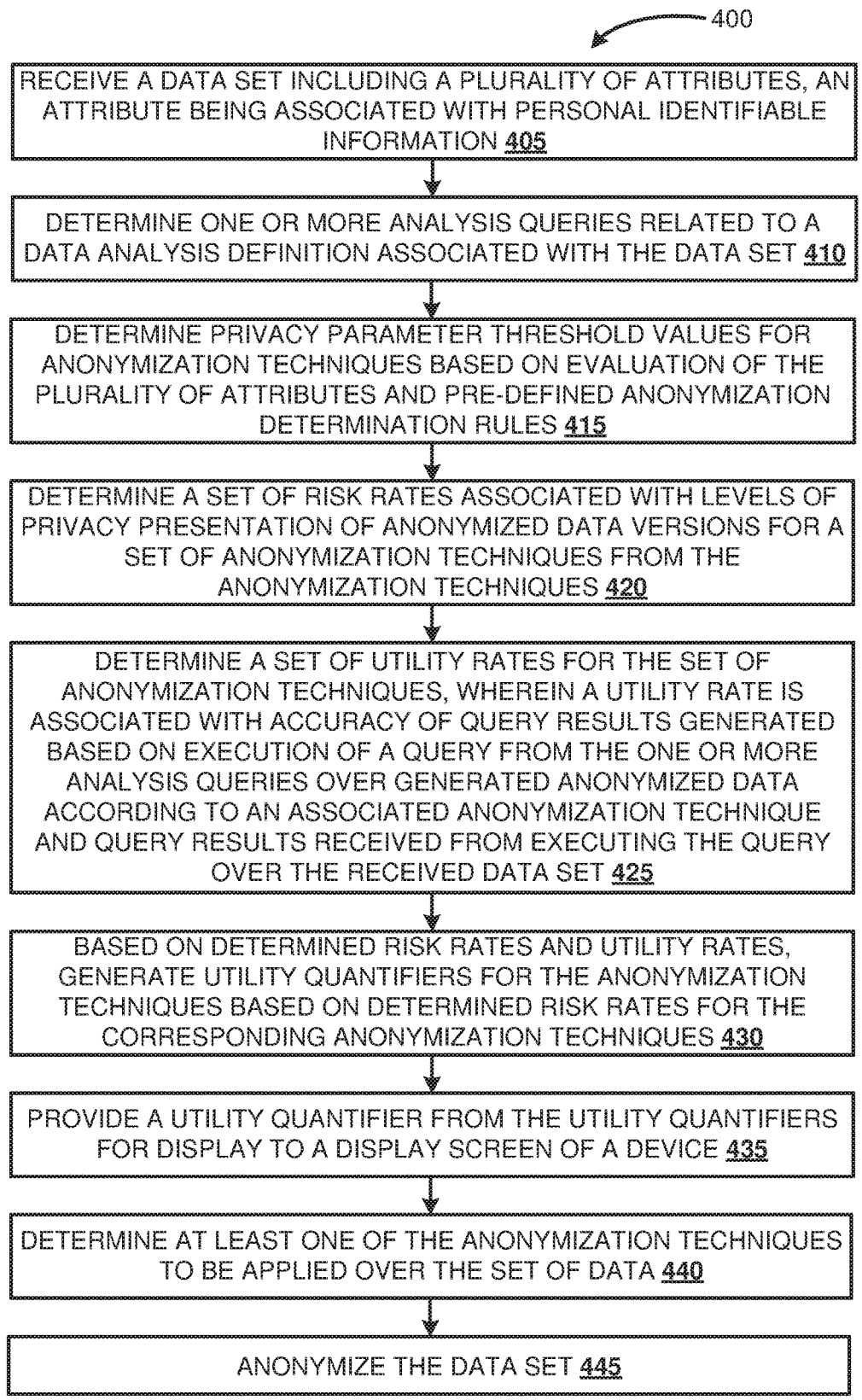
FIG. 4 is a flow diagram illustrating an exemplary process for anonymizing data including personal identifiable information, according to one embodiment.

FIG. 4 is a flow diagram illustrating an exemplary process 400 for anonymizing data including personal identifiable information, according to one embodiment. At 405, a data set is received. The data set includes a plurality of attributes, an attribute being associated with personal identifiable information. At 410, determine one or more analysis queries related to a data analysis definition associated with the data set. At 415, privacy parameter threshold values are determined in relation to anonymization techniques. The determination of the privacy parameter threshold values is based on evaluation of the plurality of attributes and pre-defined anonymization determination rules. At 420, a set of risk rates is determined, where the risk rates are associated with levels of privacy presentation of anonymized data versions for a set of anonymization techniques from the anonymization techniques. At 425, a set of utility rates is determined for the set of anonymization techniques, wherein a utility rate is associated with accuracy of query results generated based on execution of a query from the one or more analysis queries over generated anonymized data according to an associated anonymization technique and query results received from executing the query over the received data set. At 430, based on determined risk rates and utility rates, generate utility quantifiers for the anonymization techniques based on determined risk rates for the corresponding anonymization techniques. At 435, a utility quantifier from the utility quantifiers is provided for display to a display screen of a device. At 440, at least one of the anonymization techniques is determined to be applied over the data set. In some example, a combination of anonymization techniques may be applied over the data set. At 445, based on the determined at least one anonymization technique, the data set is anonymized.

Figure 5:
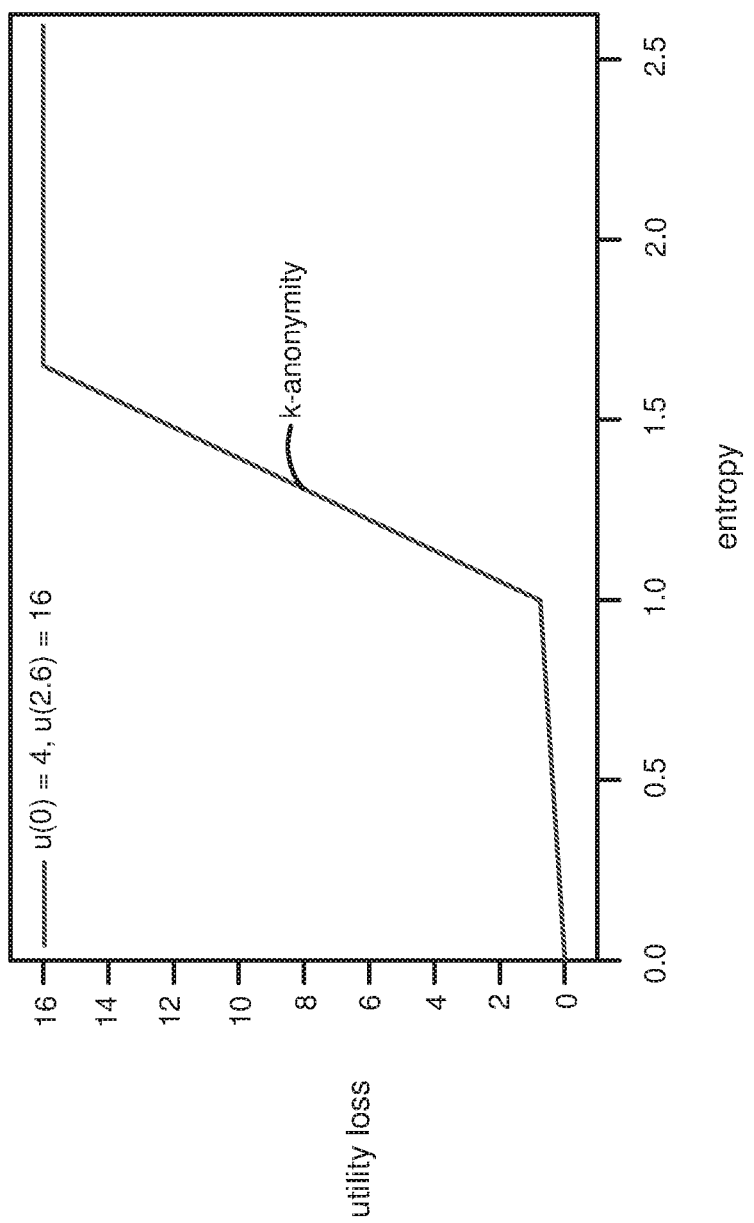
FIG. 5 is a chart diagram illustrating an exemplary utility loss functions as a function of a risk metric when determining utility rates associated with a k-anonymity anonymization technique to be applied over protected data, according to one embodiment.
Figure 6:
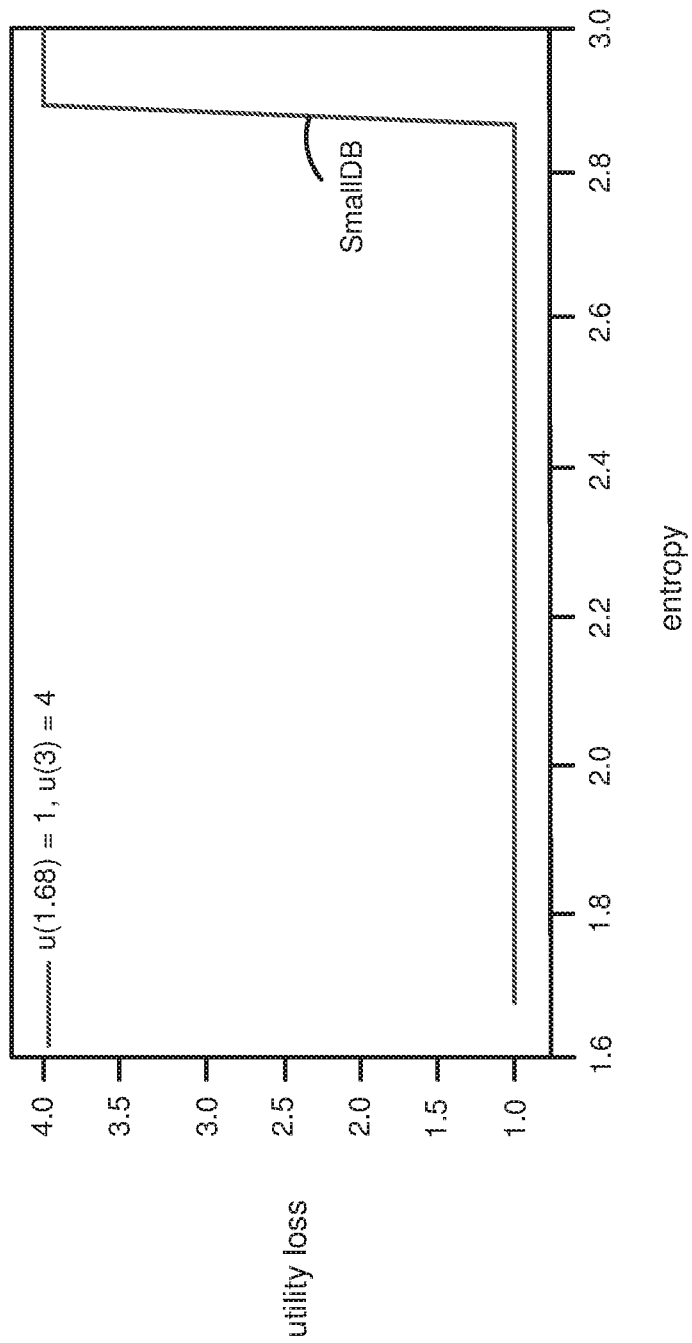
FIG. 6 is a chart diagram illustrating an exemplary utility loss functions as a function of a risk metric when determining utility rates associated with a SmallDB anonymization technique to be applied over protected data, according to one embodiment.

FIG. 5 and FIG. 6 present an exemplary utility loss functions in function of the risk.

Figure 7:
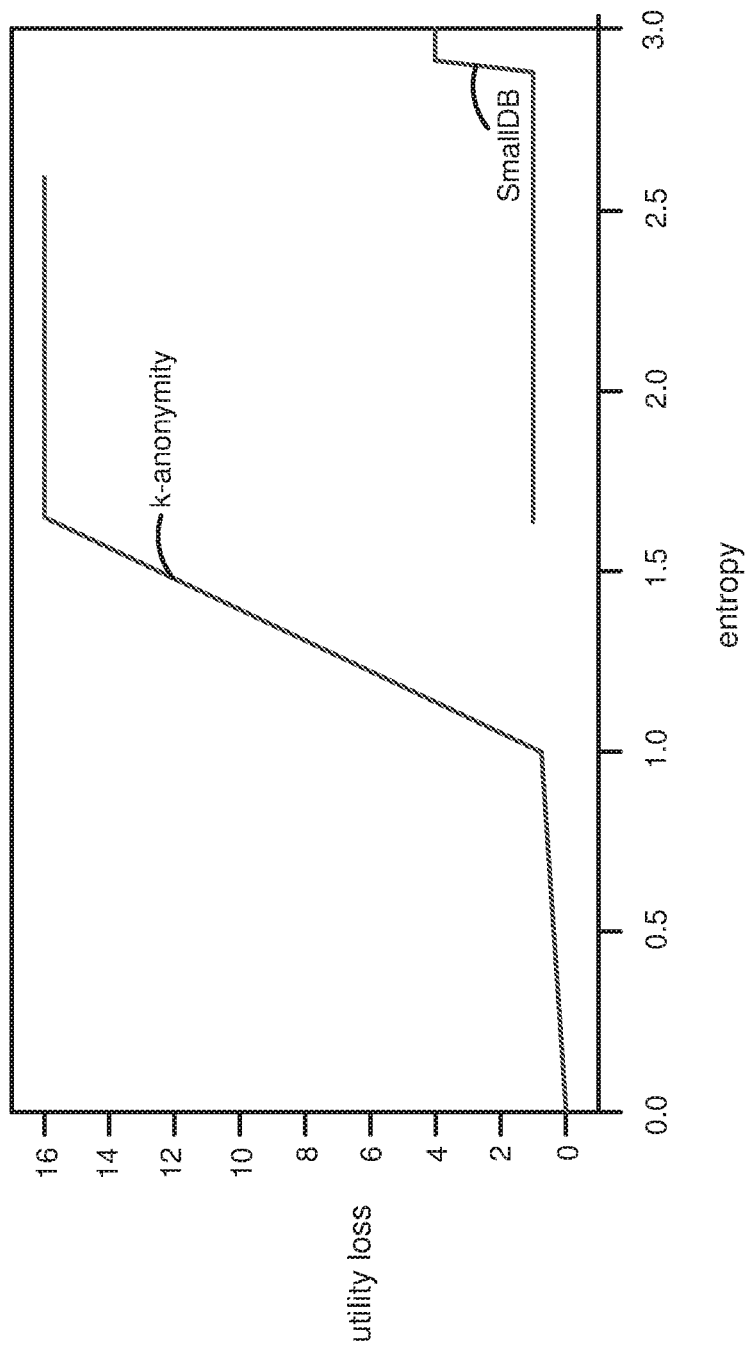
FIG. 7 is a diagram illustrating an exemplary display of a combination of two plots of utility loss functions on one canvas for better comparability, according to one embodiment.

FIG. 7 is a diagram representing a combination of two plots of utility loss functions on one canvas for better comparability. In the example provided on FIG. 7, the utility loss for the SmallDB algorithm is determined to be lower for a much smaller risk (higher entropy). The optimal choice of anonymization will be to use SmallDB with an a of around 7.5 to ensure to have a better utility-privacy trade-off. But, we remind that this value of a is higher than the threshold accepted by the data owner based on attribute weights. The maximum acceptable ε=3 leads to a lower entropy but with the same utility loss, and being always better than k-anonymity. Therefore, based on such presented diagram illustrating computations of utility and risk rates, it may be advisable to make the choice of anonymizing the data using SmallDB with ε=3.

When the characteristics of the anonymization technique as determined in the system are provided, one may decide which one to use based on the utility-privacy trade-off as defined by the provided computations of utility and risk rates. The characteristics may be provided on a user interface of an application running on a device providing computational and display resources.

Some embodiments may include the above-described methods being written as one or more software components. These components, and the associated functionality may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
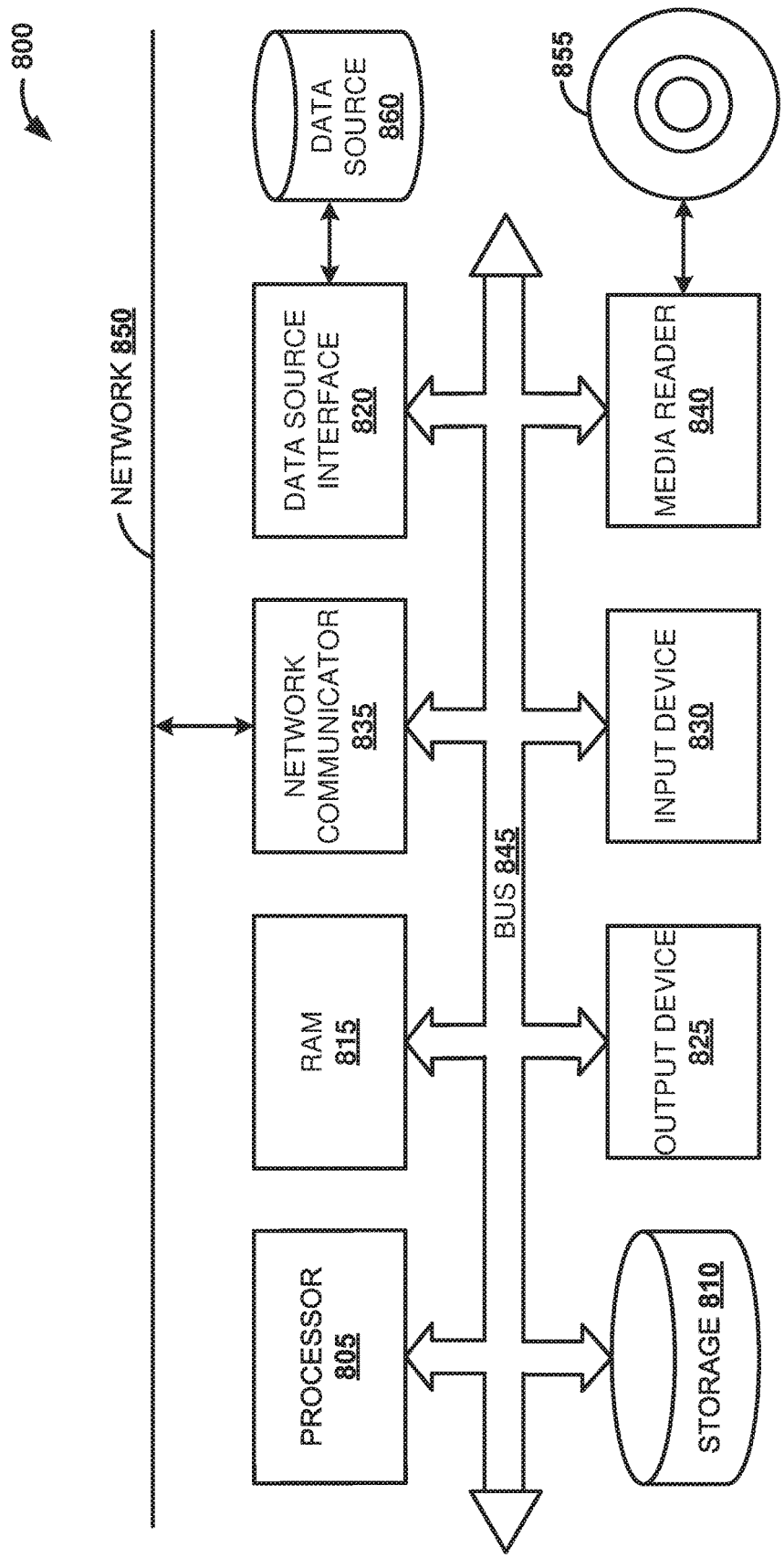
FIG. 8 is a block diagram illustrating an embodiment of a computing environment in which the techniques described for anonymization of data, can be implemented.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 450 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method to anonymize data, the method comprising:
   receiving a set of data for a data analysis, wherein the set of data includes data fields which include personal identifiable information;
   determining identification values respectively associated with each of a plurality of the data fields;
   determining importance values associated with each of the plurality of the data fields;
   for each of a plurality of anonymization techniques, determining a personal identification risk rate based on the identification values, and a utility rate for the data analysis based on the importance values;
   determining a combination of one or more anonymization techniques from the plurality of anonymization techniques based on the determined risk rates and utility rates; and
   anonymizing the set of data according to the determined combination of anonymization techniques.

2. The method of claim 1, wherein a first personal identification risk rate is related to a privacy protection failure, and a first utility rate is related to accuracy of the data analysis.

3. The method of claim 2, further comprising:
   defining a risk rate threshold value and a utility rate threshold value to determine the combination of anonymization techniques from the one or more anonymization techniques.

4. The method of claim 3, wherein the determined combination of anonymization techniques is associated with an overall risk rate and an overall utility rate that conform to the determined risk rate threshold value and the utility rate threshold value.

5. A computer system comprising:
   a processor;
   a memory in association with the processor storing instructions executable by the processor to cause the computing system to:
      receive a data set for a data analysis, wherein the data set includes data fields which include personal identifiable information;
      determine identification values respectively associated with each of a plurality of the data fields;
      determine importance values associated with each of the plurality of the data fields;
      for each of a plurality anonymization techniques, determine a personal identification risk rate based on the identification values, and a utility rate for the data analysis based on the importance values;
      determining at least one anonymization technique from the plurality of anonymization techniques based on the determined risk rates and utility rates; and
      anonymizing the data set according to the determined at least one anonymization technique.

6. The system of claim 5, wherein a first personal identification risk rate is related to a privacy protection failure, and a first utility rate is related to accuracy of the data analysis.

7. The system of claim 5, wherein the memory further includes instructions executable by the processor to cause the computing system to:
   define a risk rate threshold value and a utility rate threshold value to determine the at least one anonymization technique from the anonymization techniques.

8. The system of claim 5, wherein the memory further includes instructions executable by the processor to cause the computing system to:
   determine a combination of anonymization techniques from the anonymization techniques.

9. The system of claim 8, wherein the determined combination of anonymization techniques is associated with an overall risk rate and an overall utility rate that conform to a determined risk rate threshold value and a utility rate threshold value.

10. The system of claim 5, wherein the memory further stores instructions executable by the processor to cause the computing system to:
    define an analysis query related to the data analysis defined associated with the data set; and
    wherein a determined utility rate is associated with accuracy of query results generated based on execution of the analysis query over generated anonymized data according to an associated anonymization technique and query results received from executing the analysis query over the received data set.

11. The system of claim 10, wherein the memory further stores instructions executable by the processor to cause the computing system to:
    based on determined risk rates and utility rates, generate utility quantifiers for the anonymization techniques based on risk rates determined for the anonymization techniques.

12. A non-transitory computer-readable medium storing instructions, which when executed cause a computer system to:
    determine one or more analysis queries related to a data analysis definition associated with a data set, wherein the data set includes data fields;
    determine identification values respectively associated with each of a plurality of the data fields;
    determine importance values associated with each of the plurality of the data fields;
    for each of a plurality of anonymization techniques, determine a personal identification risk rate based on the identification values, and a utility rate for the data analysis based on the importance values;
    determine, based on determined risk rates and utility rates, at least one of the anonymization techniques to be applied over the data set.

13. The computer-readable medium of claim 12, further comprising instructions to:

receive the data set, wherein at least one of the plurality of attributes of the data set is associated with personal identifiable information.

14. The computer-readable medium of claim 12, further comprising instructions to:
anonymize the data set according to the determined at least one anonymization techniques.

15. The computer-readable medium of claim 12, wherein a first risk rate is related to a privacy protection failure.

16. The computer-readable medium of claim 12, wherein a first utility rate is related to accuracy of the data analysis when applied over first anonymized data.

* * * * *